W. P. LOUDON.
STORAGE BATTERY CONSTRUCTION.
APPLICATION FILED FEB. 13, 1918.

1,316,490. Patented Sept. 16, 1919.

WITNESS:
Dominic P. Cone.
Joseph Munder

INVENTOR.
Warren P. Loudon
BY
Raymond H Van Vleet
ATTORNEY.

UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

1,316,490.     Specification of Letters Patent.     Patented Sept. 16, 1919.

Application filed February 13, 1918. Serial No. 216,988.

*To all whom it may concern:*

Be it known that I, WARREN P. LOUDON, a citizen of the United States, residing at Niagara Falls, in the county of Niagara and State of New York, have invented new and useful Improvements in Storage-Battery Construction, of which the following is a specification.

The present invention relates to storage battery construction.

In storage batteries which are to be used for any purpose except stationary work, it is necessary to take special precautions to prevent the escape of electrolyte from the interior of the storage battery cell along the electrical conductors which lead from the interior of the cell to the exterior thereof. The present invention relates to a construction whereby the electrolyte will be prevented from escaping along said electrical conductors.

An object of the present invention is to provide a construction wherein the electrical conductors may extend from the interior to the exterior of a storage battery cell without extending through the cover of such storage battery cell.

A further object of the invention is to provide a construction wherein all the lead burning may be accomplished and inspected before the cover is mounted in the cell. A further object is to provide a novel construction which is easily and cheaply assembled and which will effectually prevent the escape of electrolyte from the interior of the cell along the electrical conductors extending therefrom.

Further objects will be apparent as the description proceeds.

Referring to the drawings:—

Figure 1:
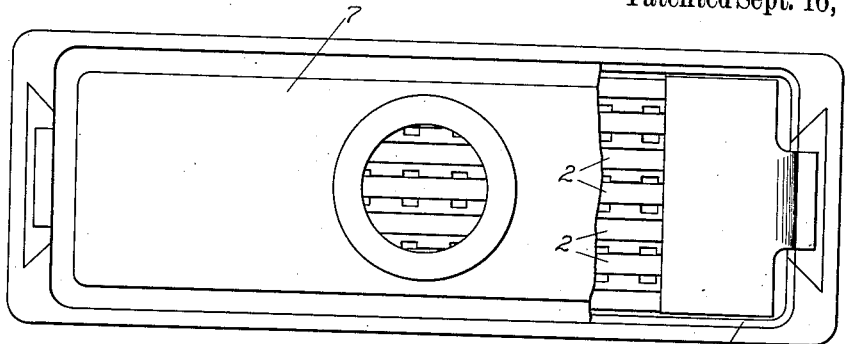
Figures 1 and 2 represent in plan and sectional elevation respectively, one embodiment of the present invention.
Figure 2:
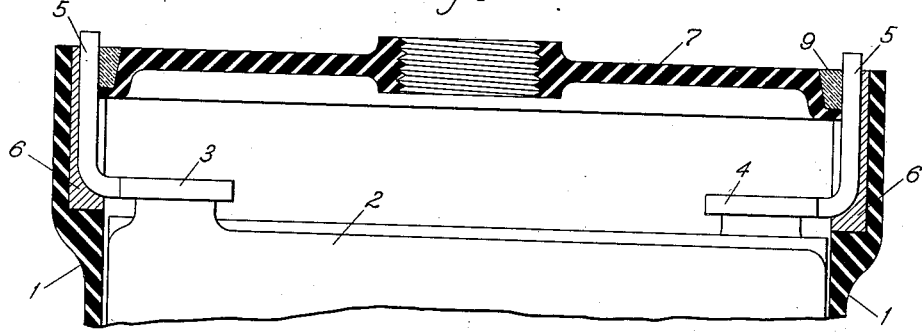

Referring first to Figs. 1 and 2, the numeral 1 indicates the wall portion of a storage battery cell. Mounted within said wall portion are a number of plates 2, 2, those of one polarity being electrically and mechanically connected together by means of a strap 3, while those plates of opposite polarity are electrically and mechanically connected together by means of a strap 4. Each of the straps 3 and 4 has an electrical conductor connected therewith, which electric conductors are represented by the numerals 5, 5. Said conductors 5, 5, are adapted to extend to the exterior of the cell whereby to provide the means for making the electrical connections. Straps 3, 4, and electric conductors 5, 5, will ordinarily be composed of lead. Any other suitable fusible metal may be used, however.

Mounted in the wall portion 1 on opposite sides of the cell are a pair of metal inserts 6, 6 which may be dove-tailed into the wall portions 6 or held therein in any other preferred manner. Said inserts 6, 6, should be adapted to be fused to the conductors 5, 5, and should have such a conformation as to receive said conductors 5, 5. After the plates 2 have been mounted in the storage battery cell and the electric conductors 5, 5, suitably positioned with reference to the inserts 6, 6, said electric conductors 5 may be integrally united to the inserts 6, 6, by being burned thereto.

After the plates 2 have been mounted in the cell and each electric conductor 5 has been integrally united to its insert 6, the cover 7 may be mounted in the cell. Said cover 7 may rest upon a suitably located shoulder 8 extending around the inside of the wall portion 1. The cover 7 may be sealed to the wall portion 1 by means of sealing compound 9, extending entirely around the cover 7 and tightly sealing the cover 7 to the wall portion 1 to prevent the escape of electrolyte therebetween.

Figures 3, 4:
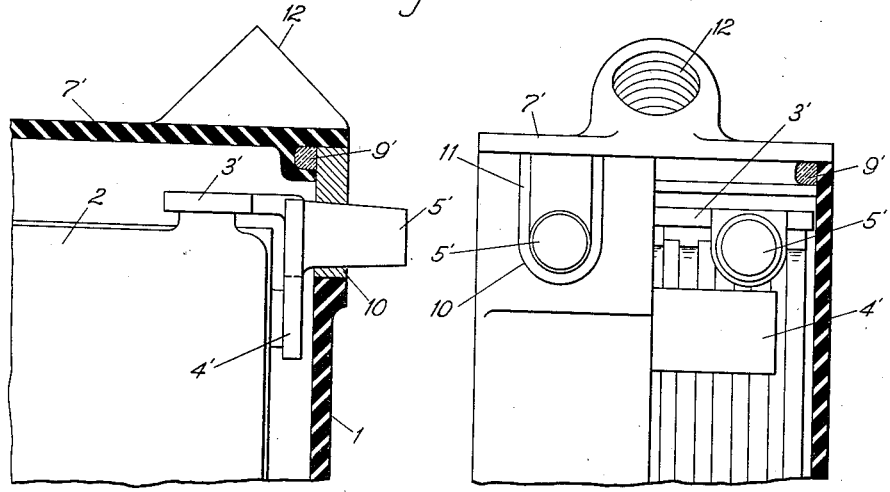
Figs. 3 and 4 represent in sectional side and end elevation respectively another embodiment of the present invention.

Referring now to Figs. 3 and 4, the wall portion 1 may be provided with a pair of notches 10, 10. Preferably said notches will be on the same side of the cell, though they may be on different sides, if preferred. In Figs. 3 and 4 the plates 2 are provided with straps 3' and 4', each connected with electric conductors 5', 5'. Each of the notches 10 is provided with an insert 11 of fusible metal. In assembling the plates 2 within the cell, the electric conductors 5, 5, will be located within notches 10, 10 in contact with the inserts 11. Electric conductors 5', 5' will then be burned to the inserts 11, thereby being integrally united therewith. The remainder of the notches 10 will then be filled up with fusible metal, whereby to produce a smooth top all around the wall portion 1.

The particular cover illustrated in Figs. 3 and 4 has a channel member extending around the four sides of the cover, which channel member may be filled up with sealing compound 9' adapted to be inserted through suitably located holes in the cover 7'. Said cover 7' is thus tightly sealed to said wall portion 1 to effectively prevent the escape of electrolyte therebetween. The cover 7' has been illustrated with a filling and inspection aperture 12 adjacent to that side of the cell from which the conductors 5', 5' extend. The axis of said aperture is arranged at an angle to the wall portion whereby to be readily accessible from the side.

The construction illustrated in Figs. 3 and 4 has the advantage that the electrical conductors extend from the cell on one side thereof, and that the filling aperture 12 is readily accessible from the same side. This construction has the advantage that the cells, after being mounted in position are readily accessible from one side for filling, inspection and repairs without removal from said position. A construction utilizing the advantages just referred to forms the subject-matter of another application by the present applicant, Serial No. 216,989 filed of even date herewith.

In both of the embodiments illustrated and described it will be noted that there is no possibility that the weight of the plates within the cell will be carried by the cover. Breakage of the cover will thus be minimized. Furthermore, the burning which is necessary in connection with the cell may be done before the cover is inserted. Ready removal of the cover is thus provided for. Furthermore, in both of the embodiments illustrated, the electrical conductors, being composed of lead or similar metal, and therefore flexible, will permit the plates to be supported from the bottom, even though inaccuracies of workmanship may occur in fusing the conductors to the metal inserts.

The described embodiments of the present invention have been chosen merely for the purpose of illustration. Many modifications will occur to those skilled in the art. It is intended in this patent to cover all such modifications that come within the scope of the present invention as defined by the appended claims.

What I claim as new and desire to secure by Letters Patent of the United States, is—

1. A battery cell having walls and a cover, opposite walls being provided with metal inserts, and electrical conductors extending from the interior of said cell integrally united to said inserts.

2. In a battery cell, two sets of plates of opposite polarities, each set being connected to an electrical conductor, a wall portion for said cell, and a cover, said wall portion being provided with a pair of apertures, each of said apertures being provided with an insert to which one of said conductors is integrally united.

3. A battery cell having a wall portion and a cover, said wall portion being notched adjacent to said cover to permit the passage of electrical conductors from the interior to the exterior of said cell, said notched portion being filled up with inserts integrally united to said conductors.

4. A battery cell having plates of opposite polarities, a strap connecting plates of one polarity, another strap connecting plates of the other polarity, said straps being arranged adjacent to one another and each having a flexible connection for supporting a cell post and a cell post mounted on each of said connections, said cell posts extending through a side wall of said cell.

5. A battery cell having plates of opposite polarities, a strap connecting plates of one polarity, another strap connecting plates of the other polarity, said straps being arranged adjacent to one another and each having a flexible connection for supporting a cell post, a cell post mounted on each of said connections, said cell posts extending through a side wall of said cell and fusible inserts in said side wall to which said cell posts are integrally united.

6. A battery cell having juxtaposed plates of the ordinary rectangular type, a strap connecting plates of one polarity, another strap connecting plates of the other polarity, said straps being arranged in different planes adjacent to a corner of said plates, each of said straps having a flexible connection for supporting a cell post and a cell post mounted on each of said connections, said cell posts extending through a side wall of said cell.

7. A battery cell having juxtaposed plates of the ordinary rectangular type, a strap connecting plates of one polarity, another strap connecting plates of the other polarity, said straps being arranged in different planes adjacent to a corner of said plates, each of said straps having a flexible connection for supporting a cell post and a cell post mounted on each of said connections, said cell posts extending through a side wall of said cell at substantially the same level.

8. A battery cell having juxtaposed plates of the ordinary rectangular type, a strap connecting plates of one polarity, another strap connecting plates of the other polarity, said straps being arranged in different planes adjacent to a corner of said plates, each of said straps having a flexible connection for supporting a cell post, a cell post mounted on each of said connections, said cell posts extending through a side wall of said cell, and fusible inserts in said side wall to which said cell posts are integrally united.

9. A battery cell having a wall portion and a cover, said cover being adapted to be tightly sealed to said wall portion, said cover being free from electrical conductors extending therethrough, and electrical conductors extending from the interior of said cell to the exterior thereof, said wall portion being provided with inserts to which said conductors are integrally united.

In witness whereof, I have hereunto subscribed my name.

WARREN P. LOUDON.